US012536557B2

(12) United States Patent
Schultz et al.

(10) Patent No.: US 12,536,557 B2
(45) Date of Patent: Jan. 27, 2026

(54) RISK ASSESSMENT MANAGEMENT SYSTEM AND METHOD

(71) Applicant: Merchant & Gould P.C., Minneapolis, MN (US)

(72) Inventors: William Schultz, Plymouth, MN (US); Gabrielle L. Kiefer, Saint Paul, MN (US)

(73) Assignee: Merchant & Gould P.C., Minneapolis, MN (US)

( * ) Notice: Subject to any disclaimer, the term of this patent is extended or adjusted under 35 U.S.C. 154(b) by 234 days.

(21) Appl. No.: 18/304,847

(22) Filed: Apr. 21, 2023

(65) Prior Publication Data

US 2023/0342798 A1 Oct. 26, 2023

Related U.S. Application Data

(60) Provisional application No. 63/333,454, filed on Apr. 21, 2022.

(51) Int. Cl.
*G06Q 30/02* (2023.01)
*G06Q 10/0635* (2023.01)
*G06Q 30/0203* (2023.01)

(52) U.S. Cl.
CPC ..... *G06Q 30/0203* (2013.01); *G06Q 10/0635* (2013.01)

(58) Field of Classification Search
CPC .......................................... G06Q 10/00–90/00
See application file for complete search history.

(56) References Cited

U.S. PATENT DOCUMENTS

| | | | | |
|---|---|---|---|---|
| 7,593,891 | B2 * | 9/2009 | Kornegay | G06Q 40/08 705/38 |
| 2013/0179988 | A1 * | 7/2013 | Bekker | H04L 63/0823 726/27 |
| 2021/0248624 | A1 * | 8/2021 | Keren | G06Q 50/184 |
| 2021/0312400 | A1 * | 10/2021 | Irimie | H04L 63/1416 |
| 2024/0220900 | A1 * | 7/2024 | Larkin | G06N 20/00 |

* cited by examiner

*Primary Examiner* — Arif Ullah
(74) *Attorney, Agent, or Firm* — Merchant & Gould P.C.

(57) ABSTRACT

A brand protection tool for managing risk to a brand is disclosed. The brand protection tool may provide a survey to a user. The survey may include a plurality of questions related to intellectual property. Based at least in part on the survey responses, the brand protection tool may determine a risk score, a protection score, and a net protection score. The brand protection tool may automatically generate a report including the net protection score and a visualization including a representation of the risk score and protection score. The brand protection tool may provide the report to a user or downstream system.

19 Claims, 10 Drawing Sheets

|  | First Question Set | Impact | Cross Question Impact | | | | |
|---|---|---|---|---|---|---|---|
|  |  |  | Q1 | Q2 | Q3 | Q4 | Q5 |
| Q1 | *What is the Industry?* |  |  |  |  |  |  |
|  | Apparel | -10 | 1 | 0 | 2 | 4 | 0 |
|  | Footwear | -5 | 4 | 2 | 4 | 1 | 0 |
|  | Watches/Jewelry | -9 | 4 | 0 | 3 | 1 | 3 |
| Q2 | *When did you start selling?* |  |  |  |  |  |  |
|  | Over 1 year ago | -4 | 3 | 4 | 1 | 2 | 1 |
|  | Less than 1 year ago | -2 | 4 | 2 | 1 | 0 | 0 |
|  | Plan to start in 6 months | 0 | 0 | 0 | 0 | 0 | 0 |
|  | Plan to start in 1 year | 5 | 3 | 5 | 3 | 1 | 3 |
| Q3 | *Expected time in market?* |  |  |  |  |  |  |
|  | Less than 1 year | 0 | 0 | 3 | 1 | 2 | 0 |
|  | More than 1 year | -1 | 4 | 4 | 6 | 1 | 0 |
| Q4 | *Expected market?* |  |  |  |  |  |  |
|  | United States | -2 | 2 | 1 | 0 | 4 | 3 |
|  | China | -10 | 3 | 4 | 1 | 0 | 3 |
|  | EU | -3 | 3 | 0 | 3 | 2 | 1 |
|  | Mexico | -1 | 2 | 0 | 0 | 0 | 3 |
| Q5 | *How much competition?* |  |  |  |  |  |  |
|  | Little | -6 | 4 | 2 | 1 | 3 | 0 |
|  | A lot | -3 | 1 | 2 | 0 | 4 | 1 |
| Total |  | -14 | 12 |  |  | 8 |  |
|  | Binary Question Set |  |  |  |  |  |  |
|  |  | Impact | Protection: 33 | | | | |
| Q1 | Utility Patent? | 8 | Risk: -14 | | | | |
| Q2 | Trademark? | 7 | BPI: 19 | | | | |
| Q3 | Monitor Policy? | 5 |  |  |  |  |  |
| Q4 | Enforcement Policy? | 5 |  |  |  |  |  |
| Q5 | Freedom to Operate? | 5 |  |  |  |  |  |
| Total |  | 13 |  |  |  |  |  |

RISK ASSESSMENT MANAGEMENT SYSTEM AND METHOD

RELATED APPLICATIONS

This application claims priority to U.S. Provisional Patent Application Ser. No. 63/333,454 filed on Apr. 21, 2022, entitled "Risk Assessment Management System and Method," which is hereby incorporated by reference in its entirety, including the appendix filed therewith.

BACKGROUND

There are various risks that may threaten to undermine intellectual property rights. For example, counterfeit goods may pose a problem. Among other things, an entity may lose sales or market share due to unauthorized counterfeit goods. Furthermore, there are risks to intellectual property rights that can result in harms that go beyond lost sales, including risks that may result in a decrease in customer goodwill, a weakened brand, or expenses incurred while trying to stop intellectual property theft.

There are various challenges, however, with respect to protecting intellectual property rights. As an initial matter, intellectual property can cover a wide range of rights in a wide variety of industries. For instance, risks for an intellectual property right in one situation may be different than risks for an intellectual property right in a different situation. Furthermore, the appropriate response to intellectual property risks can vary. For example, the appropriate response to a risk may vary by the type of intellectual property at risk, the industry, the circumstances of a particular situation, and other factors. Thus, given the diversity of potential risks to intellectual property and the variety of possible responses, it can be difficult to determine what risks intellectual property is exposed to, the magnitude of those risks, and how an entity can respond to the risks.

BRIEF DESCRIPTION OF THE DRAWINGS

FIG. 5 illustrates example aspects of analyzing data.

SUMMARY

Figure 1:
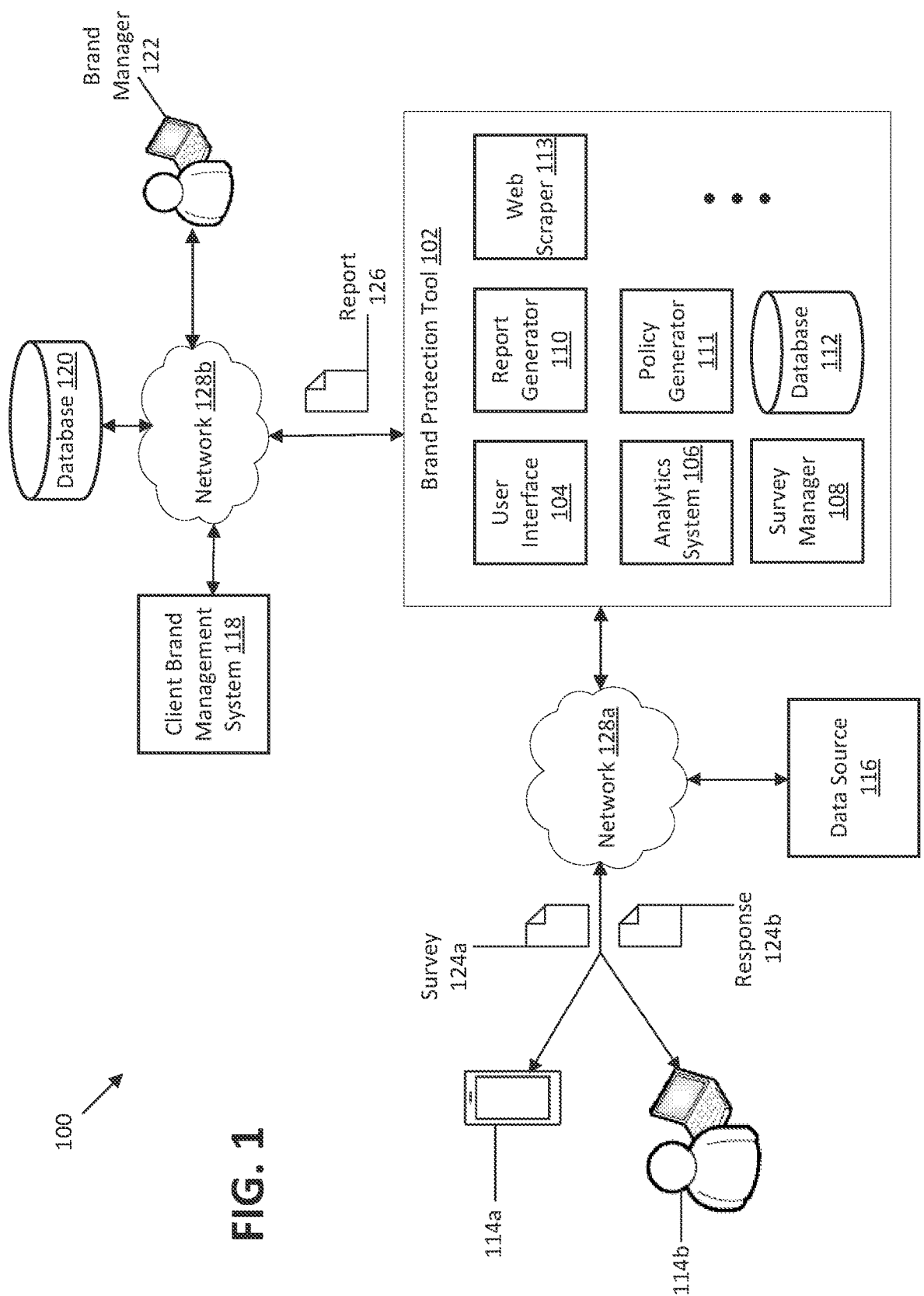
FIG. 1 illustrates a network environment in which aspects of the present disclosure can be implemented.

Aspects of the present disclosure relate to a brand protection method and system. Specifically, aspects of the of the present disclosure relate to a tool that can receive data related to intellectual property protection, analyze the data, automatically generate a report, and output the report and other information to a downstream user or system.

In a first example aspect, a method for assessing brand risk is disclosed. The method comprises providing a survey to a user; receiving a user input, the user input comprising a plurality of responses to a plurality of questions of the survey; calculating, based on the user input, a plurality of metrics related to brand protection, the plurality of metrics related to brand protection including a risk score and a plurality of protection scores; determining, using the risk score and the plurality of protection scores, a net brand protection score; automatically generating a brand protection report, the brand protection report comprising the net brand protection score and a visualization; and displaying the brand protection report via a user interface; wherein the visualization comprises a plurality of displayed protection regions; wherein each displayed protection region of the plurality of displayed protection regions corresponds with a protection score of the plurality of protection scores; and wherein the visualization comprises a risk display, the risk display overlapping with at least some displayed protection regions of the plurality of displayed protection regions.

In a second example aspect, a system for assessing risk to a brand is disclosed. The system comprises a user interface and a brand protection tool communicatively coupled to the user interface. The brand protection tool includes a processor and memory, the memory storing instructions that, when executed by the processor, cause the brand protection tool to: provide, via the user interface, a survey to a user; receive a user input, the user input comprising a plurality of responses to a plurality of questions of the survey; calculate, based on the user input, a plurality of metrics related to brand protection, the plurality of metrics related to brand protection including a risk score and a plurality of protection scores; determine, using the risk score and the plurality of protection scores, a net brand protection score; automatically generate a brand protection report, the brand protection report comprising the net brand protection score and a visualization; and display the brand protection report via the user interface; wherein the visualization comprises a plurality of displayed protection regions; wherein each displayed protection region of the plurality of displayed protection region corresponds with a protection score of the plurality of protection scores; and wherein the visualization comprises a risk display, the risk display overlapping with at least some displayed protection regions of the plurality of displayed protection regions.

In a third example aspect, a brand protection tool is disclosed. The brand protection tool comprises a processor and memory, the memory storing instructions that, when executed by the processor, cause the brand protection tool to: provide a survey to a user, the survey including a plurality of questions generated by a natural language processing tool in response to a first prompt; receive a plurality of responses to a plurality of questions of the survey; calculate, based at least in part on the plurality of responses, a plurality of metrics related to brand protection, the plurality of metrics related to brand protection including a plurality of risk scores and a plurality of protection scores; determine, using the plurality of risk scores and the plurality of protection scores, a net brand protection score; automatically generate a brand protection report, the brand protection report comprising the net brand protection score and a visualization; display the brand protection report via a user interface; generate, using the natural language processing tool, a second plurality of questions; formulate a second prompt that references the second plurality of questions; generate, by inputting the second prompt into the natural language processing tool, code for a website; receive answers to the second plurality of questions via the website; and generate, by inputting the answers to the second plurality of questions into the natural language processing tool, an artificial intelligence use policy; wherein the visualization comprises a plurality of displayed protection regions; wherein each displayed protection region of the plurality of displayed protection region corresponds with a protection score of the plurality of protection scores; and wherein the visualization comprises a risk display corresponding to the plurality of risk scores.

DETAILED DESCRIPTION

As briefly described above, aspects of the present disclosure relate to a system and method for assessing and managing intellectual property risks.

FIG. 1 illustrates an example network 100 in which aspects of the present disclosure can be implemented. In the example of FIG. 1, the network 100 includes a brand protection tool 102, users 114a—b, a data source 116, a brand management system 118, a database 120, and a brand manager 122. The protection tool 102 can, in some embodiments, have various components, including, for example, a user interface 104, an analytics system 106, a survey manager 108, a report generator 110, a policy generator 111, a database 112, a web scraper 113, and other subsystems. In the example of FIG. 1, the brand protection tool 102 (including the components that make it up), the users 114a—b, and the data source 116 can be communicatively coupled via the network 128a. Furthermore, the brand protection tool 102, the brand management system 118, the database 120, and the brand manager 122 can be communicatively coupled via the network 128b.

In some embodiments, the brand protection tool 102 can, as is further described below, receive data, analyze the data, and automatically generate a report. The data and the report may relate to intellectual property protection or relate to protection of another type of portfolio (e.g., a real estate portfolio or an investment portfolio). One type of intellectual property protection may include brand protection, and vice-versa. For example, the data received by the brand protection tool 102 and the report generated by the brand protection tool 102 may relate to an entity's patents, trademarks, copyrights, trade secrets, domain names, or other intellectual property. An entity may be, for example, a company, a person, a group of people, a private or public organization, an association, or another organization or person that has an interest in intellectual property, that has a past or potential interest in intellectual property, or that wants to learn more about risks to intellectual property. In some embodiments, an entity may be a collection of entities. In some embodiments, the intellectual property rights described herein may not belong to or otherwise associated with a single entity or set of entities. Instead, the intellectual property rights may be a collection of patents, trademarks, copyrights, trade secrets, domain names, or other intellectual property rights that may not be associated with a common entity.

In some embodiments, the brand protection tool 102 can receive data related to intellectual property via the user interface 104. In some embodiments, the brand protection tool 102 may receive data related to another type of portfolio, such as a real estate or investment portfolio. For example, the brand protection tool 102 can provide the user interface 104 to a user to collect data from the user. The user interface 104 can be displayed as part of a mobile application, for example, or it can be part of a web application, for example. The user interface 104 is further described below, and an example user interface 104 is discussed in connection with FIG. 3.

The brand protection tool 102 can use the analytics system 106 to, among other things, analyze data related to intellectual property (or another portfolio type) that is received via the user interface 104. Furthermore, as part of analyzing data, the analytics system 106 may use data stored, for example, in the database 112, such as data related to how the information received via the user interface is to be, for example, weighted, categorized, and processed. As described below, the analytics system 106 can, among other things, determine one or more risks, one or more protection scores, and an index score for a client. Furthermore, in some embodiments, the analytics system 106 may use data scraped from the internet as part of generating a risk score, a protection score, or an index score.

The brand protection tool 102 can use the survey manager 108 to monitor, edit, and otherwise manage surveys that are provided to users, for example, via the user interface 104. For example, the survey manager 108 may, in some examples, keep track of sets and combinations of questions used in surveys, analyze trends in survey responses, match certain surveys to certain clients, manage pilot questions for surveys, and store previous iterations of surveys. Furthermore, in some embodiments, the survey manager 108 may use a natural language processing tool to generate survey questions.

The brand protection tool 102 can use the report generator 110 to generate a report related to a user's intellectual property protection or to another type of portfolio. As is further described below, the report generator can use data determined by the analytics system 106 or the web scraper 113, among other data, to generate a report that includes, for example, a snapshot analysis and explanation of the status of a user's intellectual property protection, risks, hypothetical situations, recommendations, and other information. In some examples, the report generator 110 can use artificial intelligence or machine learning models or techniques, including natural language processing and generation techniques, to automatically generate one or more aspects of a report.

Natural language processing uses various algorithms, models, and techniques to facilitate computer generated analysis and interaction using human language. Natural language processing can be used to perform sentiment analysis, machine translation, question answering, summarization, and more. At a high level, natural language processing works by processing text, extracting important features of the text, and modeling a result using a variety of machine learning and deep learning models. Examples of deep learning models include Generative Pre-trained transformer (GPT) based models and Bidirectional encoder representation (BERT) based models.

The brand protection tool 102 can use the policy generator 111 to generate a policy for a user or an entity or organization associated with a user. For example, the policy generator 111 may generate a policy related to artificial intelligence use, intellectual property, financial operations, or another domain. In some embodiments, the policy generator 111 may include a natural language processing tool that implements a large-language model that is fine-tuned to generate text in response to a user query. In some embodiments, the natural language processing tool is GPT4, ChatGPT, another GPT-based model, a BERT-based model, or another tool that implements a transformer-based architecture. In some embodiments, the natural language processing tool may generate domain-specific questions based on a prompt, generate code for a web or mobile application that presents the questions to a user, and generate a policy based on a user's response to the questions. In some embodiments, the policy generator 111 may expose an API that may be called to generate a policy. In some embodiments, the policy generator 111 may be accessed via a website. Example operations of the policy generator 111 are further illustrated and described below in connection with FIG. 10. Additionally, in some embodiments, the brand protection tool 102 may use the policy generator 111 in connection with generating recommendations or generating hypothetical scenarios, processes which are further described below.

The brand protection tool 102 can use the web scraper 113 to determine information about a portfolio (e.g., an IP, real estate, or financial portfolio), or to determine risks facing a portfolio, from the internet. In some embodiments, the web scraper 113 is configured to identify risks to a portfolio based on internet data. As an example in the context of patents, the web scraper 113 may be configured to extract claimed features from one or more patents. The web scraper 113 may scrape information from online websites to identify products that may have—or be related to—the extracted claim features. In examples, the web scraper 113 may analyze one or more of text, images, or metadata of information scraped from the internet. If an identified product is sufficiently similar (e.g., the web scraper 113 has a confidence level above a threshold value, or the web scraper 113 has identified a certain number of claimed features), then the web scraper 113 may trigger an alert, or the web scraper 113 may collect data about the identified product and provide the data to another component of the brand protection tool 102, such as the analytics system 106, the report generator 110, or policy generator 111.

The web scraper 113 may also be used for other forms of IP (e.g., trademarks), and it may also be used outside of the IP domain, such as for real estate or financial portfolios. In some instances, a risk score or a protection score for a portfolio may increase if the web scraper 113 identifies products related to the portfolio. For instance, the web scraper 113 may identify counterfeit goods, the presence of which may increase a risk to an IP portfolio. Additionally, the web scraper 113 may determine a quantity of counterfeit goods and other information about counterfeit goods that are being sold.

In some embodiments, the web scraper 113 may scrape data from retail websites. In some embodiments, the web scraper 113 may scrape data from articles, blog posts, social media posts, or other internet sources. In some embodiments, the web scraper 113 may also include a web crawler. In some embodiments, the web scraper 113 may include a plurality of web scrapers and crawlers, some of which may be configured to retrieve data for certain products or data from certain websites.

In some embodiments, the web scraper 113 may implement artificial intelligence systems or techniques as part of identifying products or information that may be relevant to a portfolio. For example, the web scraper 113 may apply a machine learning model to understand textual data about a product, such as a product description, product attribute, a product review, or product metadata. Furthermore, in some embodiments, the web scraper 113 may apply a machine learning model to perform a computer vision task on one or more images of the product. For example, using such a machine learning model, the web scraper 113 may identify features in a product image or classify a product based on an image. In some embodiments, the web scraper 113 may include a multi-modal model that extracts product features based on both textual and visual information. Yet still, in some embodiments, the web scraper 113 may use artificial intelligence to efficiently perform other web scraping or web crawling tasks, such as identifying relevant URLS, quickly discarding irrelevant products and spending more computational resource time on analyzing possibly relevant products, parsing data, or managing proxies to avoid being identified as a bot.

The database 112 can include data that is used by the brand protection tool 102 and components of the brand protection tool 102. In some embodiments, the database 112 may be coupled to the data source 116, which is further described below. In some examples, the brand protection tool 102 can include more or fewer components than those illustrated in the example of FIG. 1. Furthermore, the functions, structure, and network relationship vis-à-vis other components can be different than in the example of FIG. 1.

The users 114a—b can be, in some embodiments, people or systems who have an interest in intellectual property, who are associated with an organization that has an interest or a potential interest in intellectual property, or who want to use a service of the brand protection tool 102. The users 114a—b can be connected to one or more components of the brand protection tool 102 via the internet by using, for example, a mobile phone or a computer. In some examples, aspects of the brand protection tool 102 can be included in a mobile application, and the user 114a may use the mobile application to access aspects of the brand protection tool 102. In some examples, the users 114a—b can access the user interface 104, and via the user interface 104, the users 114a—b may be provided with a survey 124a. As described below, the survey 124a can include one or more questions related to intellectual property, to business practices, to policies, to historical data, or to other information that may be used by the brand protection tool 102. Via the user interface, the users 114a—b can, in some embodiments, answer one or more questions of the survey 124a and return the response 124b.

The data source 116 can be, for example, a system that the brand protection tool 102 or the users 114a—b can request data from. For example, the brand protection tool 102, or the users 114a—b, may access data from the data source 116 via an API or in another way. The data stored in the data source 116 can relate, in some examples, to intellectual property, to real estate, to investing, to business operations, or to information that is relevant to the users 114a— b or the brand protection tool 102. For example, the data source 116 can be a USPTO database or system, a WHOIS database, a private database, or a foreign database.

In some embodiments, a user 114 may query the data source 116 to retrieve data related to a portfolio of interest (e.g., the user's intellectual property portfolio). The user 114 may automatically populate a survey based on results from the data source 116, or the user 114 may otherwise provide data retrieved from the data source 116 to the brand protection tool 102. In examples, the user 114 may access the data source 116 by using an API exposed by a program associated with the data source 116 (e.g., the USPTO may expose an API that may be called to retrieve IP data based on a request, or a private database may expose an API that may be called to retrieve portfolio data and integrate such data in another application). In some embodiments, the brand protection tool 102 may include an API for retrieving data from the data source 116. For example, the brand protection tool 102 may include a unified API that is coupled to one or more APIs exposed by one or more data sources 116.

The brand management system 118, the database 120, and the brand manager 122 can be related to an entity that receives analytics data or reports from the brand protection tool 102. In some examples, the brand management system 118, the database 120, and the brand manager 122 can be associated with the same entity as the users 114*a*—b. The brand management system 118 can be a system that, for example, assists the entity to manage its intellectual property and other policies or procedures related to the management of the entity's intellectual property. The brand manager 122 can be, for example, an individual or a team whose responsibilities may be related to intellectual property management. In some embodiments, one or more of the brand management system 118, the database 120, or the brand manager 122 may not be associated with the same entity as the users 114*a*—b. As illustrated in the example of FIG. 1, one or more of the brand management system 118, the database 120, and the brand manager 122 can receive a report 126 from the brand protection tool 102. An example of the report 126 is further discussed below in connection with FIGS. 6-8.

Each of the networks 128*a*—b can be, for example, a wireless network, a wired network, a virtual network, the internet, or any other type of network. Furthermore, each of the networks 128*a*—b can be divided into subnetworks, and the subnetworks can be different types of networks or the same type of network. The example of FIG. 1 illustrates only one system in which the brand protection tool 102 and other elements of the example of FIG. 1 can be implemented. In other examples, there can be more or fewer components than those illustrated in the example of FIG. 1.

Figure 2:
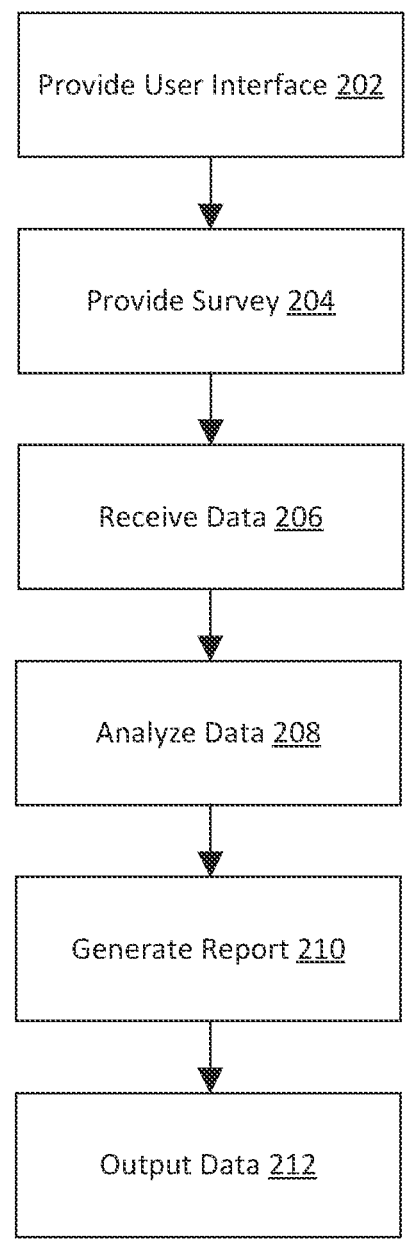
FIG. 2 is a flowchart of an example method useable by aspects of the present disclosure.

FIG. 2 illustrates an example method 200 useable by, for example, the brand protection tool 102. In the example shown, the brand protection tool 102 can provide a user interface (step 202). For example, the brand protection tool 102 can provide the user interface to a user device in response to the user accessing the brand protection tool 102.

In the example shown, the brand protection tool 102 can provide a survey via the user interface (step 204). For example, the brand protection tool 102 can select or create a survey (e.g., by selecting or creating one or more questions or sets of questions, or by using a software program such as SurveyMonkey). The brand protection tool 102 can, in some examples, format the survey into a certain file type or integrate the survey into an application. Furthermore, the brand protection tool 102 can, in some examples, tailor the survey depending on characteristics of the user, depending on the service requested by the user, depending on past data related to the user, or depending on other factors. The survey questions can relate, for example, to business practices or policies, strategy, intellectual property, an industry, markets, or other topics that may be relevant to the user of the brand protection tool 102. In some embodiments, the survey questions may include a set of binary-choice questions and a set of multiple-choice questions. The following are example survey questions from some embodiments:

1. What category best describes your product?
    a. Wearing Apparel/Accessories
    b. Footwear
    c. Watches/Jewelry
    d. Handbags/Wallets
    e. Consumer Electronics
    f. Consumer Products
    g. Pharmaceuticals/Personal Care
    h. Optical Media
    i. Toys
    j. Computers/Accessories 2. When do you plan to start selling/launching your product?
    a. Already starting selling
    b. Plan to start selling in next 6 months
    c. Plan to start selling in next year 2. How long do you expect the product to be in the market place?
    a. Slider 3. Industry
    a. [insert options]

4. What countries do you expect to manufacture? (Check boxes)
    a. United States
    b. China
    c. EU
    d. South America
    e. Central America
    f. Other 5. What countries do you expect to sell the product? (Check boxes)
    a. United States
    b. China
    c. EU
    d. Canada
    e. South America
    f. Central America
    g. Other 6. Through what channels do you intend to sell the product?
    a. Online via my website
    b. Online via 3rd Party marketplace
    c. Online via Social Media marketplaces
    d. Brick & Mortar stores 7. Have you started manufacturing the product?
    a. Yes/No 8. The product is: (check all that apply)
   a. Single product
   b. Follow on product
   c. Part of a product portfolio
   d. The first product in a product portfolio 9. My company currently uses the following external counsel:
   a. Current Firm Client
   b. No external counsel
   c. Other:_____

10. This product has been in development over:
    a. The past year
    b. The past 1-2 years
    c. The past 2-5 years
    d. More than 5 years Example Self-Assessment Questions:

1. How does your company currently value brand protection?
   a. Highly valued
   b. Somewhat
   c. Minimal 2. How would you rank the following in order from most to least importance?
   a. Formal IP Protections
   b. Manufacturing and Supply Agreements
   c. Internal Policies (MAP Policy, formal reporting procedure)
   d. Marketing 3. My company is _____ relative to competitors in protecting our brand and products.
   a. Above average
   b. Average
   c. Below average 4. My company currently devotes ____ percent of time to protecting products.
   a. Over 50%
   b. 25-50%
   c. 10- 25%
   d. Less than 10%

5. "By protecting my brand, I can expand my company's market share, decrease costs, and strengthen customer recognition."
   a. Strongly agree
   b. Agree
   c. Neutral
   d. Disagree
   e. Strongly disagree 6. The biggest problems that company faces include:
   a. Time to market for new products
   b. Costs associated with protecting products
   c. Online counterfeiting of products
   d. Legal constraints on business development
   e. Cybersquatting
   f. Lack of product or mark clearance
   g. Marketing consistency
   h. Manufacturing consistency
   i. Internal communication, coordination and efficiency 7. Order the following events as they would occur based on internal protocols: (order)
   a. Engineers/employee develop the idea
   b. Marketing generates materials for marketing the product
   c. Management approves development of product
   d. Legal is consulted
   e. Clearance searches are conducted 8. It is most important for: (Rank)
   a. Products to be developed in a timely manner
   b. Products to have the highest level of protection
   c. Costs to be minimized
   d. Management satisfaction with product
   e. Legal to approve product development
   f. Customer to be satisfied with the product
   g. Products are manufactured consistently 9. My company is strongest at:
   a. Strategizing
   b. Developing
   c. Executing
   d. Monitoring
   e. Enforcing 10. My company could improve the most at:
    a. Strategizing
    b. Developing
    c. Executing
    d. Monitoring
    e. Enforcing Example Diagnostic Questions:

1. Where are you along the spectrum in identifying your target market?
   a. Sliding scale OR Checkbox w/ activities
      i. I know exactly what customers are in my target market
      ii. Identified need
      iii. No idea about my target market 2. How saturated is your target market?
    a. Spectrum
        i. As far as I know, I am first in the marketplace
        ii. I am aware of some key competitors, but there is open space
        iii. Heavily concentrated 3. What stage are you at for the following U.S. IP protections?
    a. Types
        i. Copyright
        ii. Trademark
        iii. Utility Patent
        iv. Design Patent
    b. 3 Stages
        i. Granted Registration
        ii. Applied for Registration
        iii. I don't have this protection 4. What international IP protections do you have:

5. How long have you had the following protections on this product?
    a. Less than 1 year
    b. 1-2 years
    c. 2-5 years
    d. More than 5 years 6. Are all contributors to this product subject to the following:
    - Assignment
    - Agreement to assist
    - Confidentiality Agreement
    - NDA
    - Crowdsourcing agreement 7. Are all images associated with this product and product packaging subject to:
    a. Copyright assignment
    b. Agreement to assist 8. To what extend have you cleared the product against third party patent rights?
        i. I have not done any clearance searching
        ii. I have done some self searching
        iii. I have gotten a formal opinion on the clearance of this product 9. To what extent have you cleared the marks you intend to use against third party marks?
        i. I have not done any clearance searching
        ii. I have done some self searching
        iii. I have gotten a formal opinion on the clearance of the marks I intend to use 10. Which of the following brand protection programs are you enrolled in? (Checkboxes)
    a. Amazon Brand Registry
    b. Amazon Transparency
    c. Amazon Project Zero
    d. Amazon Patent Program
    e. eBay VeRO
    f. Alibaba AliProtect
    g. Other 11. To what extent do you enforce you intellectual property against online 3rd party sellers? (spectrum)
    a. Spectrum
        i. Not at all
        ii. Selectively
        iii. Actively and Consistently 12. What actions have you currently taken to protect this product? (Select all that apply/checkboxes)
    a. Online marketplace removals
    b. Search Engine removals
    c. Social Media Removals
    d. C&D Letters
    e. District Court enforcement
    f. Customs & Border Patrol
    g. Trademark Opposition Filings
    h. UDRPs
    i. URS
    j. Criminal Investigations (e.g., FBI, IC3, etc.)

13. Select any of the following that you currently use to monitor IP related to this product?
    a. CorSearch Brand Protection (ZERO)
    b. IncoPro
    c. Red Points
    d. digital shadow
    e. BrandVerity
    f. TrackStreet MAP Compliance Software
    g. Wiser Solutions
    h. Prisinct
    i. Price2Spy
    j. Adthena
    k. Dataweave
    l. PriceSpider
    m. netRivals
    n. MarkMonitor
    o. OpSec
    p. CSC Global
    q. Other: _____.

14. What internal protocols do you currently have in place?
    a. MAP Policy b. Authorized Reseller Policy
c. Formal Internal Reporting Procedure
d. Guidelines for TM usage 15. The product has/will have the following:
    a. Warranty
    b. Packaging
    c. Shipment
    d. [ fill in ]

16. Which of the following do you have?
    a. Track & Trace Program
    b. Brand Identification Tells 17. Identify what manufacturing agreements (or terms) you have in place for this product? (Checkbox)
    a. Supply Agreement
    b. Non-disclosure agreement
    c. Development agreement
    d. Joint development agreement
    e. Confidentiality agreement
    f. License
    g. Work for Hire
    h. Product Specification Agreement
    i. Brand use requirements 18. Identify what distribution agreements (or terms) do you have in place? (Checkbox)
    a. Geographical Limits
    b. Online sale limitations
    c. Channel Limitations
    d. Limit on sale of product returns
    e. Inventory management restrictions 19. The following match the brand of our product: (select all that apply)
    a. Registered Domain Name(s)
    b. Social Media Account(s)
    c. 3rd Party Marketplaces
    d. Company website(s)

20. How often do the following groups meet: (1x per week, 1x per month, bi-annually, annually -- Matrix)
    a. Engineering w/ Management
    b. Engineering w/ Legal
    c. Engineering w/ Marketing
    d. Management w/ Legal
    e. Management w/ Marketing
    f. Marketing w/ Legal 21. Amount of effort/resources expended on protection 22. IP Audit
23. Cybersecurity In some embodiments, the survey may be generated by a natural language processing tool. In some embodiments, the natural language processing tool may be based on a large language model that is fine-tuned to generate text, images, figures, drawings, or other data or media in response to a query. For example, the tool may generate a plurality of survey questions based on a prompt. In some embodiments, the tool may generate questions in response to a prompt requesting that the tool generates questions for a particular domain, such as intellectual property, finance, business, education, sports or another domain. In some embodiments, the tool may generate questions in response to a prompt requesting that the tool generates questions having a particular format (e.g., single selection or multi-selection multiple choice, true or false, fill in the blank, free response, etc.). In some embodiments, the natural language processing tool may be GPT4, ChatGPT, another GPT-based model, a BERT-based model, or another tool that implements a transformer-based architecture. In some embodiments, the survey questions provided to a user during execution of the method 200 may be the same as—or overlap with—survey questions that are generated as part of generating a policy, a process that is further described below in connection with FIG. 10.

In the example shown, the brand protection tool 102 can receive data (step 206). For example, as described above, the brand protection tool 102 can receive a user input, which may be survey response data from the user. The survey response data may include an answer to one or more of the questions of the survey. Furthermore, the brand protection tool 102 may also receive other data from the user or data from other sources, such as the data source 116 of FIG. 1.

In the example shown, the brand protection tool 102 can analyze data (step 208). For example, the brand protection tool 102 can apply one or more algorithms or processes to the data received (e.g., at step 206) and to other data that the brand protection tool 102 can access, such as data retrieved or processed by the web scraper 113. For example, by analyzing the data, the brand protection tool 102 may determine one or more metrics related to an entity's intellectual property protection, such as a risk score for one or more categories, a protection score for one or more categories, a net index score, or other metrics. As another example, the brand protection tool 102 may determine one or more metrics related to a collection of intellectual property rights, irrespective of whether these rights belong to or are associated with a common entity. Furthermore, the brand protection tool 102 may determine one or more protection-related or risk-related metrics for another type of portfolio. An example of analyzing data is further described below in connection with FIGS. 4-5.

In the example shown, the brand protection tool 102 can generate a report (step 210). In some embodiments, the brand protection tool 102 can use machine learning models or techniques and other artificial intelligence applications to automatically generate a report, including, for example, descriptive text, a visualization, analysis, recommendations, and hypotheticals. To generate the report, the brand protection tool 102 can, in some examples, use one or more metrics that were determined while analyzing the data. Furthermore, the brand protection tool 102 may use other information, such as comparative data in generating the report.

In the example shown, the brand protection tool 102 can output data (step 212). For example, the brand protection tool 102 may output a report (e.g., generated at step 210) to a system, user, or entity that requested the report or who is associated with a client on whose behalf the report was created. The brand protection tool 102 may display the brand protection report, or at least aspects of the brand protection report, via a user interface. In some embodiments, the user interface used to display the brand protection report may be the same user interface via which a user input responses to survey questions. In other embodiments, there may be a plurality of different user interfaces. In some embodiments, the brand protection tool 102 may provide the brand protection report to another system, which may then display the brand protection report via a user interface. In some embodiments, the brand protection tool may provide the brand protection report or any other generated policy to an email or a repository or to another system or entity besides the input user. Furthermore, the brand protection tool 102 may, in some embodiments, output other data, such as metrics or statistics received or determined by the brand protection tool 102, to databases or other systems.

In some embodiments, the brand protection tool 102 may generate a recommended policy. For example, the brand protection tool 102 may use a natural language processing tool to generate survey questions and generate website code. A user may access the website and provide answers to the survey questions. In some embodiments, the brand protection tool 102 may use the natural language processing tool to generate a policy based at least in part on the survey questions and survey answers. In some embodiments, the policy may relate to intellectual property protection. In some embodiments, the policy may relate to technology use (such as artificial intelligence technology usage), privacy, business operations, investing, or another domain. An example of generating a policy by using a natural language processing tool is illustrated and described below in connection with FIG. 10.

In some embodiments the output may be gated. For example, the output data may be accessible only using a key such as a password or a Non-Fungible Token (NFT) or other means of identification. In some embodiments there may be a universal access key. In other embodiments, there may be a one-time access key. In some embodiments there may be a payment structure incorporated. For example, be a generated report or policy could be accessed, a payment would be made. In some embodiments the generated policy may be or include an NFT. Further details on NFTs can be found in U.S. Application No. 63/341,350, entitled "Digital Asset Agreement Generation and Verification System", which is hereby incorporated by reference in its entirety.

Figure 3:
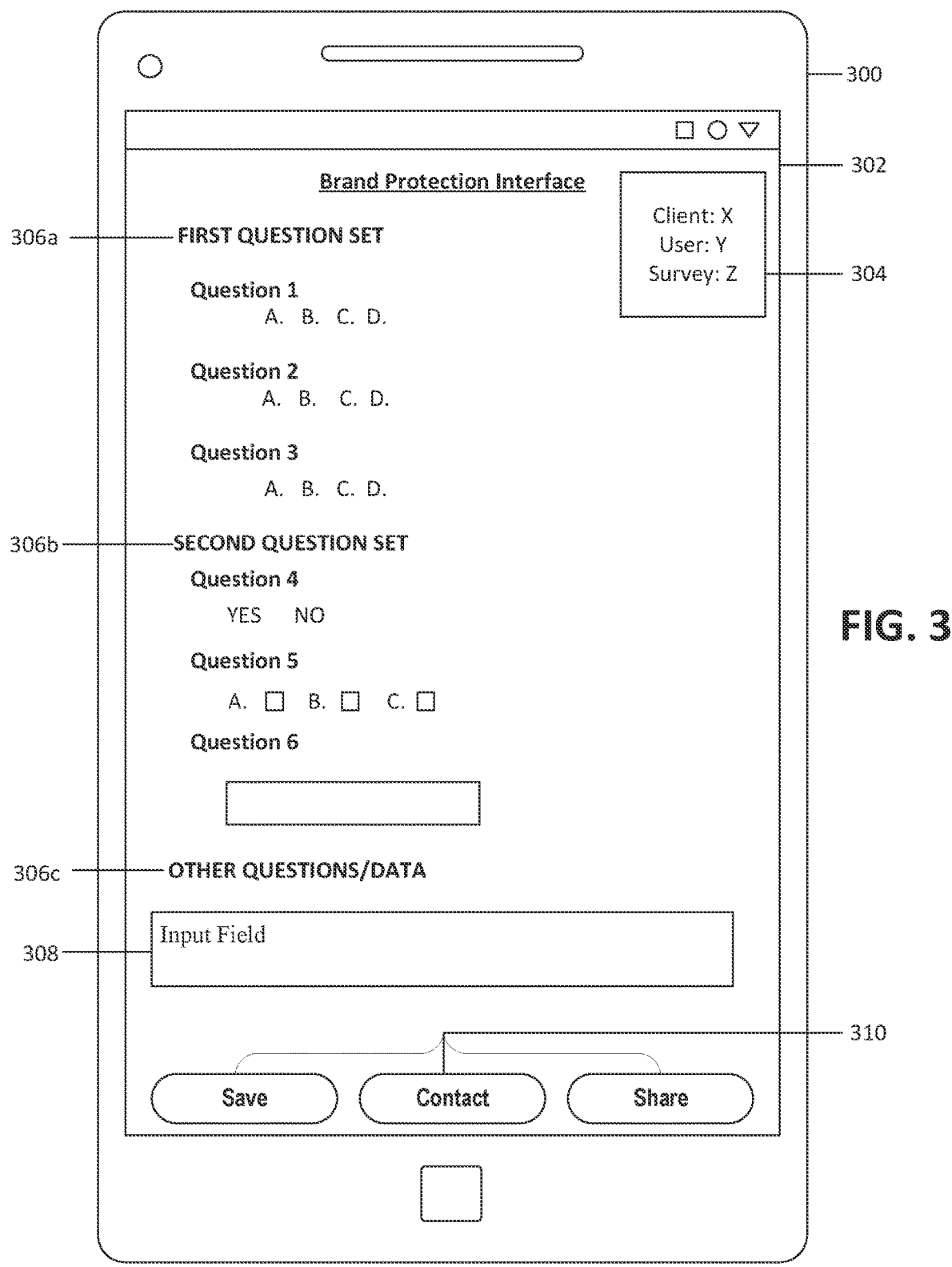
FIG. 3 illustrates an example user interface.

FIG. 3 illustrates an example user interface. In the example of FIG. 3, a user device 300 can display a user interface 302. The user interface 302 can be provided, for example, by the brand protection tool 102 to a user device 300 of one of the users 114a—b. The user interface 302 can, for example, be a part of a larger application or program. For example, the user interface 302 may be part of SurveyMonkey or another program. The user interface 302 can include data 304 that includes, for example, identity information for a client, user, or survey that are related to the user interface or its application.

As described above, the user interface 302 may include a survey, and the survey may, in some examples, have various sections. For instance, the sections 306a—c of the user interface 302 can be part of a survey. The sections 306a—c can have, for example, questions or other prompts along with input fields. The input fields can include, for example, a field for selecting one answer of a plurality of answers, a field for selecting YES or NO in response to a question, a field including one or more check boxes, a text input field, or other fields for a user to interact with the user interface 102. Furthermore, the user interface 302 may include a generic input field 308 that a user can input data into. For example, the user may include a message to the brand protection tool 102, or the user can provide information related to accessing another source of data (e.g., a USPTO database). Furthermore, the user interface 302 can, in some examples, include other features 310, which may include, for example, an option to save, to contact personnel associated with the brand protection tool 102 or associated with a survey provider, or an option to share the survey or other information.

Figure 4:
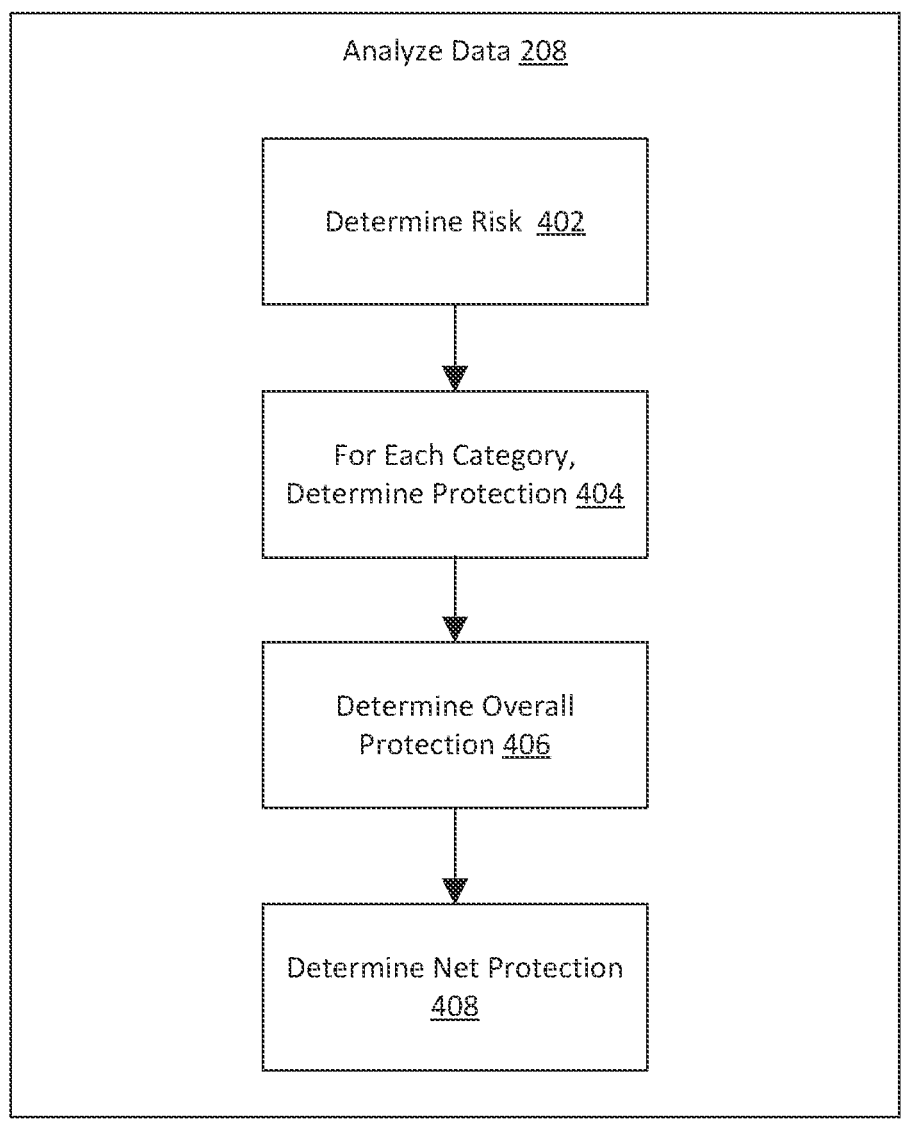
FIG. 4 is a flowchart of an example method for analyzing data.

FIG. 4 is a flowchart of an example method 400 useable by, for example, the brand protection tool 102 for analyzing data (e.g., for performing step 208 of FIG. 2). In some examples, the brand protection tool 102 can use a subsystem, such as the analytics system 106 to perform aspects of the method 400. As is further described below, the brand protection tool 102 can, in some examples, use the method 400 to generate one or more metrics related to brand protection, such as one or more risks, one or more protection scores, an overall protection, or a net protection.

In the example shown, the brand protection tool 102 can determine a risk (step 402). For example, the brand protection tool 102 can use survey response data and, in some embodiments, other data, to determine a risk score that corresponds with the risks that an entity's intellectual property or brand is facing or the risks that a collection of intellectual property rights is facing. For example, a higher risk score may indicate that it is more likely that an entity's intellectual property—or a collection of intellectual property rights—may be misappropriated, infringed, or weakened. To determine the risk score, the brand protection tool 102 can, in some embodiments, assign a risk score to questions of the survey, or to certain answers to questions in the survey. In response to determining that a user has selected a particular answer, the brand protection tool 102 may increase the risk score for that user. In some examples, the brand protection tool 102 can add together or otherwise combine the risk scores to determine an overall risk score; in other examples, the brand protection tool 102 can determine a risk score in other ways. In some examples, the brand protection tool 102 can represent the risk as a shape on a graph, such as a circle or a quadrilateral on a surface. If the risk is represented as a circle, for example, the center of the circle can be, for example, in the middle of the graph, and the radius of the circle can correspond with the risk score. In some embodiments, the brand protection tool 102 may alter a risk score based on data determined by the web scraper 113.

In some embodiments, the brand protection tool 102 can determine categories of risk. For example, the brand protection tool 102 may, based on user response data and other information, determine a risk as it relates to various aspects of brand protection, such as a risk related to intellectual property rights, a risk related to enforcing those rights, a risk related to internal policies and procedures, a risk related to a lack of coordination or poor coordination, or risks that stem from other categories.

In some embodiments, the magnitude of the risk may vary by category. For example, an entity may have a risk score of "10" for internal policies and procedure, and a risk score of "5" for enforcing intellectual property rights. In such an embodiment, an overall risk score may be represented by a quadrilateral on a coordinate plane. Each risk category may be a quadrant of the coordinate plane, and the risk for the category is represented by a vertex of the quadrilateral that is a distance from the origin. The distance may correspond with a risk for a particular category. In such an embodiment, an overall risk score for an entity may be correspond with a surface area of the quadrilateral.

In the example shown, the brand protection tool 102 can determine, for each of one or more categories, a protection score (step 404). For example, the brand protection tool 102 can determine a score that corresponds with how protected an entity is with respect to the following categories: intellectual property protection; enforcement; policies and programs; and strategic coordination. In other examples, there can be more, less, or different categories. In some embodiments, the scores determined by the brand protection tool 102 need not be for a particular entity, but rather may be for a collection of intellectual property rights more generally.

The IP protection score can relate, for example, to the number and quality of patents, copyrights, trademarks, trade secrets, domains, and data that an entity has or that are part of a collection of intellectual property rights. In some embodiments, such data may be automatically retrieved and processed from a USPTO database, another governmental data, a commercial database, or another database that store information related to intellectual property.

The enforcement score can relate, for example, to an entity's willingness or history with enforcing its intellectual property rights. Enforcing the intellectual property rights can include, for example litigating in District Court, reporting to government agencies, sending takedown or cease and desist letters, reporting to specific platforms, such as AliProtect or Vero, using registries, or taking other actions related to enforcement.

The policies and programs score can relate, for example, to whether an entity has certain policies or programs in place related to intellectual property protection (e.g., minimum advertised price policies or authorized reseller programs) and, in some embodiments, to whether those policies and programs are regularly practiced.

The strategic coordination score can relate, for example, to whether an entity is taking steps to protect intellectual property across the lifespan of a product or mark, such as during the design phase, manufacturing phase, and product launch phase. For example, the strategic coordination score may depend on whether the appropriate people (e.g., intellectual property professionals) are involved during various phases of a product or mark lifespan.

To determine a protection score for each category, the brand protection tool 102 can, in some embodiments, use survey response data provided by a user and other information. For example, the brand protection tool 102 may assign a protection value to survey question answers that relates to protection. For instance, for a question related to whether an entity has a particular policy in place, the brand protection tool 102 may assign a protection value of "1" to the answer "YES" and a protection value of "0" to an answer of "NO." If the user selects "YES" in the survey response, then the brand protection tool 102 may increment the protection score for the policies and programs category by 1. Furthermore, in some embodiments, an increase or decrease in a protection score may depend on one or more answers to one or more questions. For instance, a particular answer to a first survey question may increase a user's protection score, but only if the user selected a particular answer to a second survey question. An example of survey questions and survey question dependency is further described below in connection with FIG. 5.

Furthermore, in some examples, an answer to a survey question may have a different impact on different protection scores for different categories. For instance, selecting a certain answer to a survey question may increase a protection score for IP protection by a first amount, increase a protection score for policies and programs by a second amount, and leave unchanged—or decrease—a protection score for enforcement or for strategic coordination. Furthermore, the protection score can be impacted by other data than just the survey data, for example by data stored in the brand protection tool 102 or by data received from another source, like the data source 116. As another example, the protection score may be impacted by data determined by the web scraper 113. For instance, if the web scraper 113 identifies counterfeit goods or identifies competitors, then a protection score may decrease for one or more categories. Furthermore, in some embodiments, the brand protection tool may utilize other techniques for determining a protection score for one or more of the categories. For example, the brand protection tool may use a machine learning model that is trained to predict a protection score based on survey inputs and/or other characteristics of an entity. Yet still, the manner in which the brand protection tool determines a category protection score may vary by entity.

In the example shown, the brand protection tool 102 can determine an overall protection score (step 406). For example, the brand protection tool 102 can combine the one or more protection score (calculated, for example, at step 404). To do so, the brand protection tool 102 can, in some embodiments, add together each of the protection scores. In other examples, the brand protection tool 102 can calculate an area that corresponds with the brand protection scores. For example, if there are four brand protection scores, then each score can correspond to a point in a quadrant of a surface or graph, such as a coordinate plane. In such an example, the overall protection score can be determined, for example, by calculating the area of a quadrilateral that includes all four points as vertices. In other examples, the brand protection tool 102 can determine an overall protection score in another way. As one example, the brand protection tool 102 may use a liner regression model that receives as inputs the protection scores for the categories. As another example, the brand protection tool 102 may use a machine learning model trained to infer an overall protection score based on category-level protection scores and other data.

In the example shown, the brand protection tool 102 can determine a net protection score (step 408). For example, the brand protection tool 102 can determine a net protection score by subtracting a risk score from an overall protection score. In some embodiments, for example when the risk is graphed and one or more protection scores are graphed, determining the net protection score can include subtracting the surface area that represents risk from the surface area that represents the overall protection. In other examples, the net protection can be calculated in another way, and it may use other data besides the risk, the one or more protection scores, and the overall protection. A brand protection index (BPI), an example of which is further described below in connection with FIG. 5, can be an example of a net protection score.

FIG. 5 illustrates an example spreadsheet 500 useable by, for example, the brand protection tool 102 when analyzing data. The example spreadsheet 500 includes survey questions, such as the questions in the first question set and the set of questions under the binary question set. Furthermore, the spreadsheet 500 includes survey response data, as indicated by the answers that are in gray. For example, in the example spreadsheet 500, a user indicated, among other things, that their product is in the "Footwear" category and that they have an "Enforcement Policy" in place.

As shown in the example spreadsheet 500, some of the answers to the survey questions are assigned a value. In some examples, a positive value can indicate protection and a negative value can indicate risk. For example, an answer of "Footwear" to the question related to industry can result in a risk of five. In some examples, the values can be created by professionals in the intellectual property profession, the values can be determined based on historical or predicted data, the values can be generated by software-implemented algorithms, or the values can be determined in another way. Furthermore, as illustrated in the example spreadsheet 500, an answer to one question can affect the impact of an answer to another question, as shown in the "Cross Question Impact" section. For example, because the user responded that they are in the "Footwear" industry and because they responded that they have a utility patent (Q1 of the Binary Question Set), the brand protection tool 102 determines, in the example of FIG. 5, to increase the protection score by 4. In other examples, dependencies between questions do not exist or they are implemented in a different way. In the example of FIG. 5, there is a risk of 14 and an overall protection of 33. Furthermore, a brand protection index, an example of a net protection score, is calculated as 19. As will be understood, the example of FIG. 5 is for illustrative purposes, and the brand protection tool 102 can perform other and different operations when analyzing data.

Figure 6:
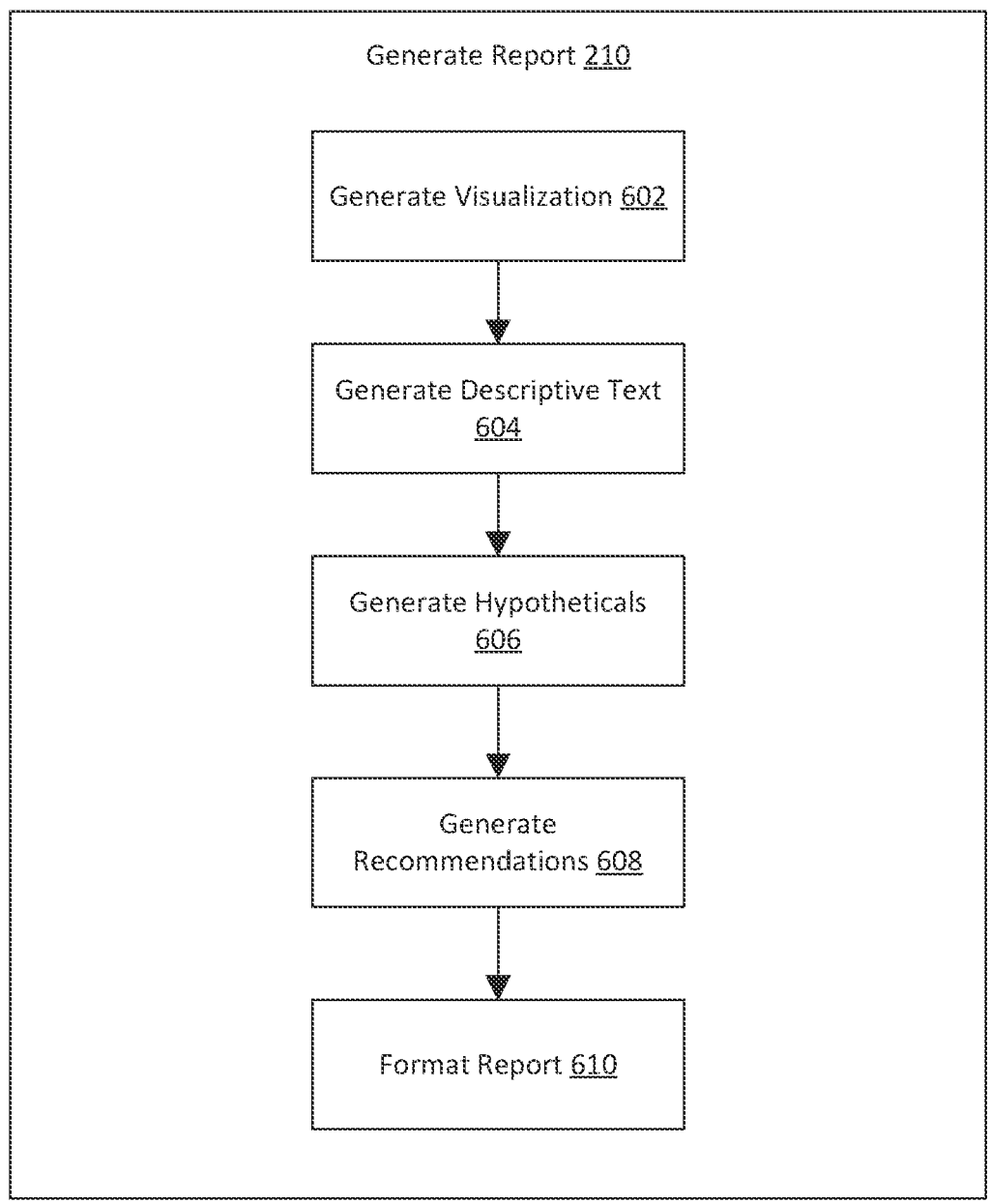
FIG. 6 is a flowchart of an example method for generating a report.

FIG. 6 is a flowchart of an example method 600 useable by, for example the brand protection tool 102. The method 600 can be used by the brand protection tool 102 in some examples to generate a report (e.g., to perform step 210 of FIG. 2). In some examples, the brand protection tool 102 can use the report generator 110 to perform one or more aspects of the method 600.

In the examples shown, the brand protection tool 102 can generate a visualization (step 602). For example, the brand protection tool 102 can use data received by or determined by the brand protection tool 102 to generate a visualization. The visualization can represent, for example, one or more metrics related to brand protection, such as metrics determined by the brand protection tool 102 while analyzing data (e.g., while performing the method 400). In some examples, the brand protection tool 102 can use a third-party software tool to generate the visualization. The visualization can be, for example, a graph, a chart, an image, or another visualization. An example visualization is discussed below in connection with FIG. 7.

In some embodiments, the visualization may include a plurality of protection regions. Each of the protection regions may correspond to the one of the protection scores calculated by the brand protection tool 102, metrics that are further described above. In some instances, the protection regions may form a shape that is displayed by the visualization. In some embodiments, the size of a displayed protection region may depend on the magnitude of the protection score (e.g., if the protection score for a category is higher, then the displayed protection region may be larger).

In some embodiments, the visualization may include a risk display. The risk display may correspond to the one or more risk scores calculated by the brand protection tool 102. The risk display may be a shape (e.g., a circle), the size of which may depend on the magnitude of its corresponding risk scores (e.g., if a risk score is higher, then the risk display may be larger). In some embodiments, the visualization may include both the displayed protection regions and the risk display. For instance, the visualization may comprise two shapes, one of which includes the protection regions and the other of which includes the risk display. In some examples, these shapes may overlap. For instance, the risk display may cover at least some of the shape formed by the displayed protection regions. In some embodiments, a net protection score may correspond with a surface area of the displayed protection regions that is not covered by the risk display.

In some embodiments, the visualization may include interactive components that dynamically change or provide data in response to user inputs. For example, a user may click on, touch, or hover over an aspect of the visualization. In response, the visualization may display data or a link to another program, or the visualization may automatically start another program or access a web page. For example, a user may select a point in the visualization, and the visualization may display (e.g., in a pop-up display) risk or protection data associated with that point on the visualization. Yet still, in some embodiments, the visualization may include multiple visualizations that are displayed simultaneously, allowing a user to compare different intellectual property risk and protection data or to compare different perspectives for evaluating intellectual property risk and protection.

In some embodiments, the brand protection tool 102 may use artificial intelligence to generate a visualization. For example, the brand protection tool 102 may use one or more of Midjourney, Stable Diffusion, DALL-E, or another model. In some embodiments, the brand protection tool 102 may receive a prompt by a user or an administrator related to generating the visualization, and the brand protection tool 102 may input the prompt into a model to generate the visualization. In some embodiments, the brand protection tool 102 may generate such a prompt based, for example, on a user's answers to survey questions, based on a determined risk score, based on a determined score, or based on other information received by or determined by the brand protection tool 102. In some embodiments, the brand protection tool 102 may embed interactive components in the AI-generated visualization, such as components that may be utilized by a user to investigate a protection score, a risk score, a hypothetical scenario, or other data that may be generated by the brand protection tool 102. In some embodiments, the brand protection tool 102 may combine an AI-generated visualization with another type of visualization.

In the example shown, the brand protection tool 102 can generate descriptive text (step 604). For example, the brand protection tool 102 can use the one or more metrics related to brand protection, user input, and other data to automatically generate text that describes and analyzes one or more aspects of a client's intellectual property protection situation. In some examples, this text can be automatically generated by software using machine learning and natural language processing and generation techniques. In some examples, the descriptive text can explain one or more metrics related to brand protection (e.g., a risk score or a protection score), explain how the value was derived, and compare the value to other entities, for example to other entities of a similar size or in a similar industry. In some embodiments, the brand protection tool 102 may use ChatGPT or another generative machine learning model to generate the descriptive text.

In the example shown, the brand protection tool 102 can generate one or more hypotheticals (step 606). The brand protection tool 102 may embed the one or more hypotheticals in the repot. For example, the brand protection tool 102 can, based on the user input and other data, generate a hypothetical scenario and a result of that scenario. For example, the brand protection tool 102 may generate a scenario in which a user implemented a certain monitoring or enforcement plan, or obtained a certain intellectual property right, and the brand protection tool 102 may evaluate the effect that the scenario would have, for example, on the user's brand protection metrics. In other embodiments, the brand protection tool 102 may generate a scenario, such as a scenario in which a counterfeit good has entered the market, and the brand protection tool 102 may provide recommendations-based at least in part on the user input—for what the user should do. In some examples, the hypotheticals can be automatically generated by a software program using machine learning techniques. In some examples, a scenario may include altering survey data input by a user. For example, a user may, via a survey, indicate that an entity is not operating in a certain country, or that an entity is not in a particular industry, has a certain amount of competition, etc. . . . . . A scenario may alter that data by, for example, changing the data to determine an intellectual property protection scenario if that entity were to operate in that country, or enter an industry or if a competition level changed.

In the example shown, the brand protection tool 102 can generate one or more recommendations (step 608). The brand protection tool 102 may embed the one or more recommendations in the report. For instance, the brand protection tool 102 may identify one or more weaknesses in a client's current situation with respect to intellectual property. For instance, if the brand protection tool 102 determines that a client's risk is greater than protection, or if the protection is not sufficiently greater than the risk, then the brand protection tool 102 may identify a weakness. Based on these weaknesses, and based on other data, the brand protection tool 102 may suggest actions that the client can take to improve their intellectual property protection strategy. Furthermore, the brand protection tool 102 can also, in some embodiments, provide recommendations to clients to improve their brand protection irrespective of whether the brand protection tool 102 identified any specific weaknesses. For example, the brand protection tool 102 may generate a recommendation based on the result of a hypothetical scenario. For instance, the brand protection tool 102 may determine that, if competition increased, if an entity lets some intellectual property lapse, or if there is another change, then an entity may be exposed to risk, or a collection of intellectual property rights may be exposed to risk. In such instances, the brand protection tool 102 may generate a recommendation to mitigate the risk from such a situation. In some examples, the recommendations can be automatically generated by a software program using machine learning techniques.

In the example shown, the brand protection tool 102 can format a report (step 610). For example, the brand protection tool 102 may combine one or more of a visualization, descriptive text, hypotheticals, recommendations, and other information into a report. The report can be, for example, a file that a person can read using a computer, such as a PDF or Word document, or the reports can be formatted as a data structure or other file format for use in a downstream computer system. Furthermore, the report may be formatted for display by a web browser. For example, the report may be stored on a web server and served to a web browser in response to the web browser accessing a web site associated with the web server. In some embodiments, the report may include a combination of HTML, CSS, and JavaScript.

Figure 7:
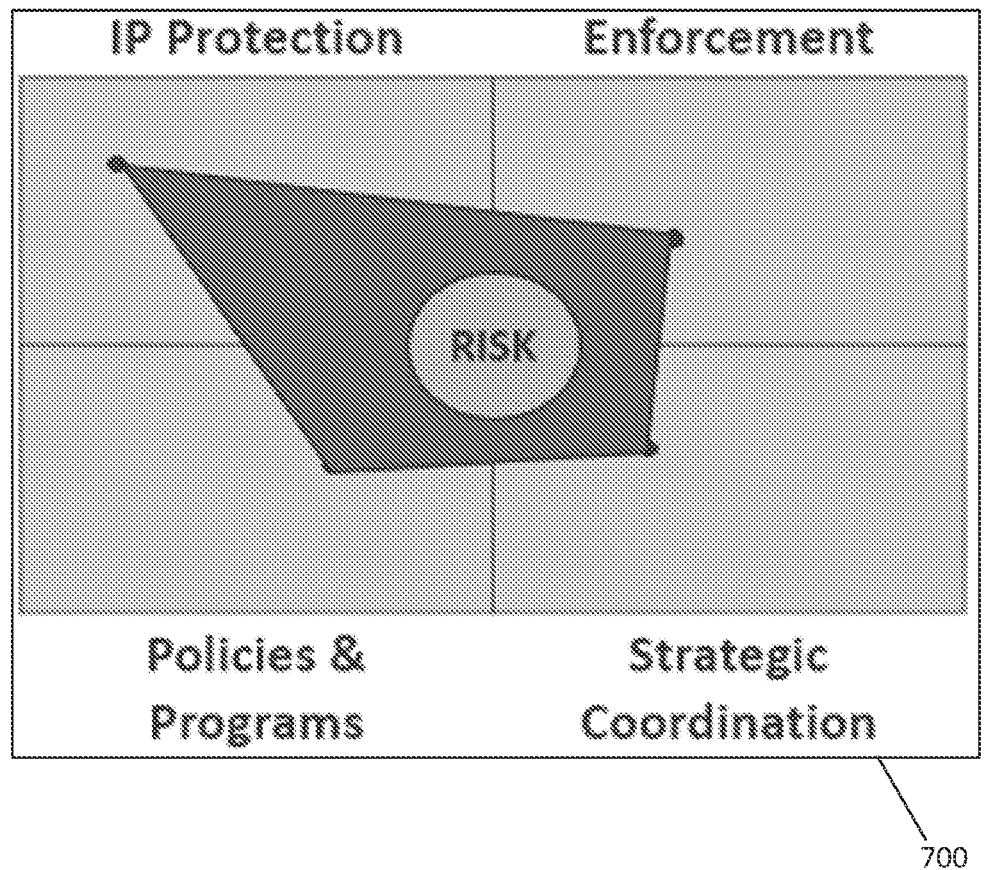
FIG. 7 illustrates an example visualization of data generated by the brand protection tool.

FIG. 7 illustrates an example visualization 700 generated by the brand protection tool (e.g., at step 602 of FIG. 6). The example visualization 700 includes a plane having four quadrants. The four quadrants are IP Protection, Enforcement, Policies & Programs, and Strategic Coordination. As shown in the example of FIG. 7, each of the quadrants may display a protection region corresponding to a protection score for that category. Together, these protection regions may form the illustrated example quadrilateral. As described above, a protection score for each category can be represented as a point in each category. The point can be, for example at a forty-five-degree angle from the center of the plane. The visualization 700 further illustrates a surface area of a quadrilateral having the four points as vertices. Furthermore, the visualization 700 includes a risk display. In the example of FIG. 7, the risk display is a circle. As shown, the circle overlaps with—and covers—some of the displayed protection regions. In other examples, the risk display may be a displayed shape other than a circle. For instance, the risk display may be an oval, a polygon, or another shape.

In the example of FIG. 7, a net protection score can be a difference in the surface area of the quadrilateral representing overall protection and the surface area of the circle representing the risk. In other examples, the brand protection tool 102 can generate other types of visualizations, such as graphs or charts. Furthermore, in some embodiments, the visualization may dynamically respond to user inputs. For instance, as described above, the visualization 700 may include interactive components, such that when a user selects (e.g., with a mouse or stylus) or touches an aspect of the visualization, the visualization may automatically display data related to the point that the user selected or may automatically call another program. For example, if the use selects a point in the "IP Protection" quadrant, then the visualization 700 may, in some embodiments, display data and risks associated with IP Protection (e.g., in a popup window or in a different program). As another example of dynamic aspects of the visualization, the visualization may change in response to a user inputting new or updated data. For example, if an entity implements a new monitoring or protection policy, then one or more shapes displayed by the visualization may be altered to reflect the entity's updated policy. As another example, an entity may request that the web scraper 113 check for counterfeits of a trademark or product. Based on the results of the web scraper 113, the visualization may dynamically change in response to an updated protection or risk score. Additionally, in some embodiments, the visualization may dynamically respond to user inputs in other ways.

Figure 8:
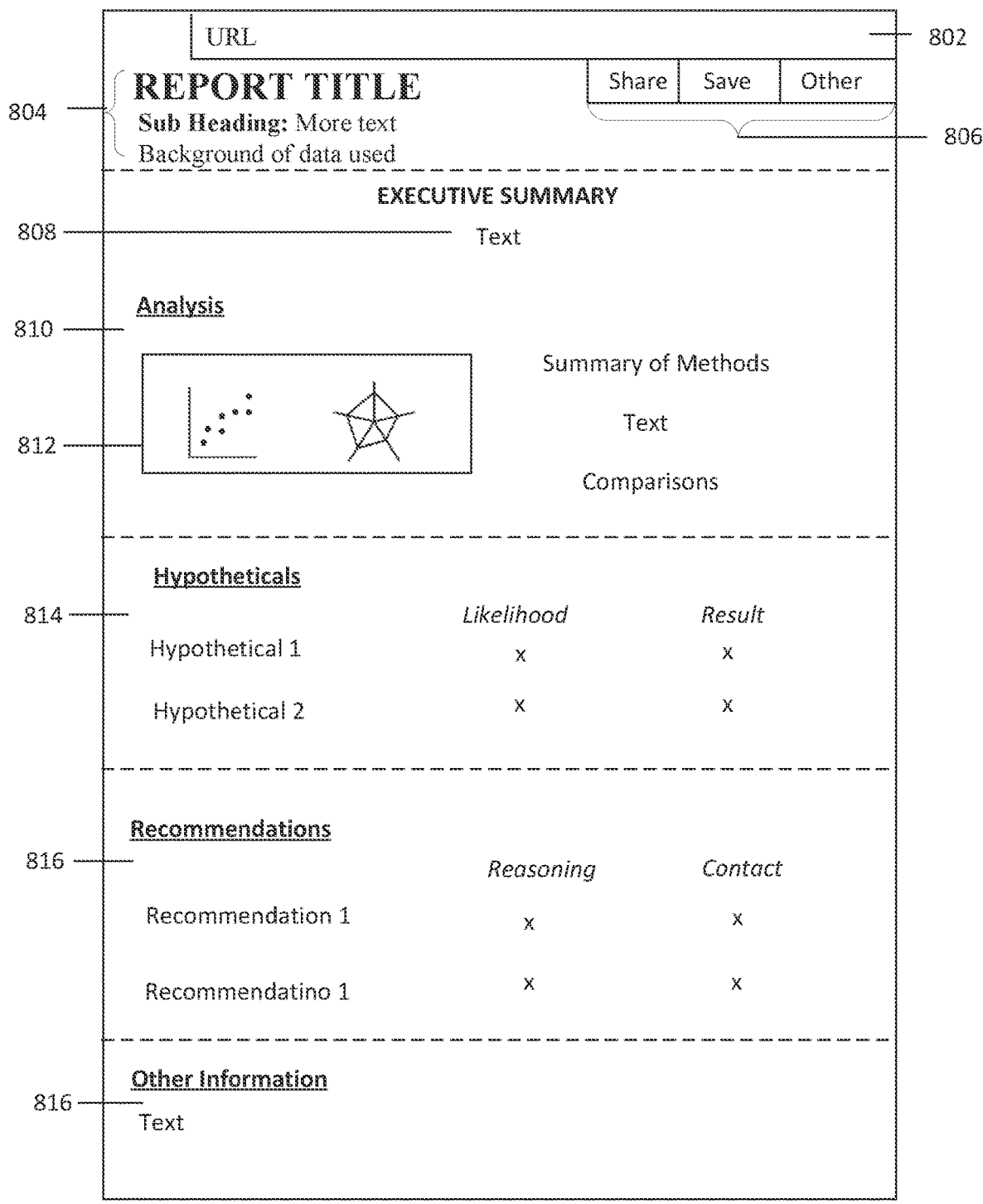
FIG. 8 illustrates an example report.

FIG. 8 illustrates an example report 800. The example report 800 can be generated, for example, by the brand protection tool 102. In some embodiments, the example report 800 may be hosted on a web server that can be accessed by a client. In such an embodiment, the report 800 may be accessed by directing a web browser to the URL 802. In some examples, the report can include background information 804, which can include, in some examples, a title, other information relevant to indexing or managing the report, and information related to the data that was used. In some examples, the report 800 can include one or more options 806, such as sharing, saving, or performing another operation with the report.

In some examples, the report 800 can include one or more sections. In other examples, the report 800 may not have such sections. In the example of FIG. 8, the report has an executive summary section 808, an analysis section 810, a hypotheticals section 814, a recommendations section 816, and a section for other information 816. Furthermore, the analysis section can include one or more visualizations 812, such as the example visualization 700 of FIG. 7. The analysis section may also include data related to how aspects of the report were generated, data explaining the analysis and findings, and comparisons of one or more metrics related to brand protection.

As described above, the report 800 may include text related to one or more hypotheticals. In the example of FIG. 8, the hypothetical section may include a likelihood that a hypothetical will occur and a predicted result if the hypothetical does, in fact, occur. As described above, the report 800 may include one or more recommendations. The report 800 may also, in some examples, include a reasoning for a recommendation and contact information for a person or entity for the client to contact if the client decides to pursue the recommendation. Furthermore, in some embodiments, the report 800 may indicate a connection—if any exists- between a recommendation and a hypothetical. For example, a recommendation may be for an entity to implement a policy of performing freedom-to-operate searches because under a hypothetical scenario (e.g., a new competitor enters market) with a likelihood above a threshold value, a policy of conducting freedom-to-operate searches may decrease an entity's intellectual property-related risk or a risk for a collection of intellectual property rights.

Figure 9:
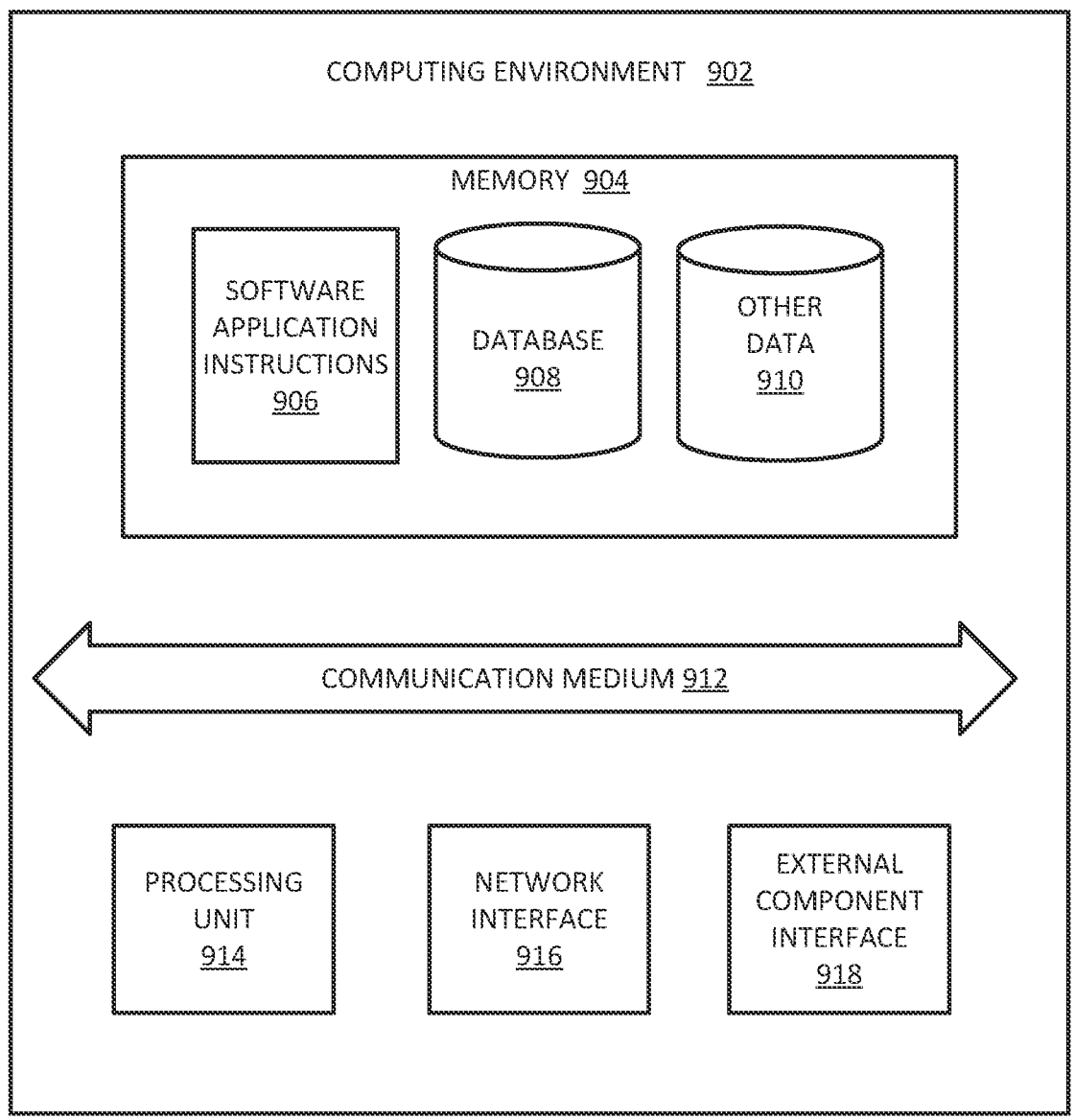
FIG. 9 illustrates an example block diagram of a computing system.

FIG. 9 illustrates an example system 900 with which disclosed systems and methods can be used. In an example, the following can be implemented in one or more systems 900 or in one or more systems having one or more components of system 900: the brand protection tool 102, the user interface 104, the analytics system 106, the survey manager 108, the report generator 110, the database 112, the users 114*a*—b, the data source 116, the brand management system 118, the database 120, the brand manager 122, the user device 300, or the user interface 302.

In an example, the system 900 can include a computing environment 902. The computing environment 902 can be a physical computing environment, a virtualized computing environment, or a combination thereof. The computing environment 902 can include memory 904, a communication medium 912, one or more processing units 914, a network interface 916, and an external component interface 918.

The memory 904 can include a computer readable storage medium. The computer storage medium can be a device or article of manufacture that stores data and/or computer-executable instructions. The memory 904 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 904 can store various types of data and software. For example, as illustrated, the memory 904 includes software application instructions 906, one or more databases 908, as well as other data 910. The communication medium 912 can facilitate communication among the components of the computing environment 902. In an example, the communication medium 912 can facilitate communication among the memory 904, the one or more processing units 914, the network interface 916, and the external component interface 918. The communications medium 912 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 914 can include physical or virtual units that selectively execute software instructions, such as the software application instructions 906. In an example, the one or more processing units 914 can be physical products comprising one or more integrated circuits. The one or more processing units 914 can be implemented as one or more processing cores. In another example, one or more processing units 914 are implemented as one or more separate microprocessors. In yet another example embodiment, the one or more processing units 914 can include an application-specific integrated circuit (ASIC) that provides specific functionality. In yet another example, the one or more processing units 914 provide specific functionality by using an ASIC and by executing computer-executable instructions.

The network interface 916 enables the computing environment 902 to send and receive data from a communication network. The network interface 916 can be implemented as an Ethernet interface, a token-ring network interface, a fiber optic network interface, a wireless network interface (e.g., Wi-Fi), or another type of network interface.

The external component interface 918 enables the computing environment 902 to communicate with external devices. For example, the external component interface 918 can be a USB interface, Thunderbolt interface, a Lightning interface, a serial port interface, a parallel port interface, a PS/2 interface, or another type of interface that enables the computing environment 902 to communicate with external devices. In various embodiments, the external component interface 918 enables the computing environment 902 to communicate with various external components, such as external storage devices, input devices, speakers, modems, media player docks, other computing devices, scanners, digital cameras, and fingerprint readers.

Although illustrated as being components of a single computing environment 902, the components of the computing environment 902 can be spread across multiple computing environments 902. For example, one or more of instructions or data stored on the memory 904 may be stored partially or entirely in a separate computing environment 902 that is accessed over a network.

Depending on the size and scale of the computing environment 902, it may be advantageous to include one or more load balancers to balance traffic across multiple physical or virtual machine nodes.

Aspects of the system 900 and the computing environment 902 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full system 900, such that portal can run and schedule jobs and serve the portal user interface as long as a single node remains functional. The environment 902 may include monitoring technology to determine when a node is not functioning so an appropriate action can be taken.

Figure 10:
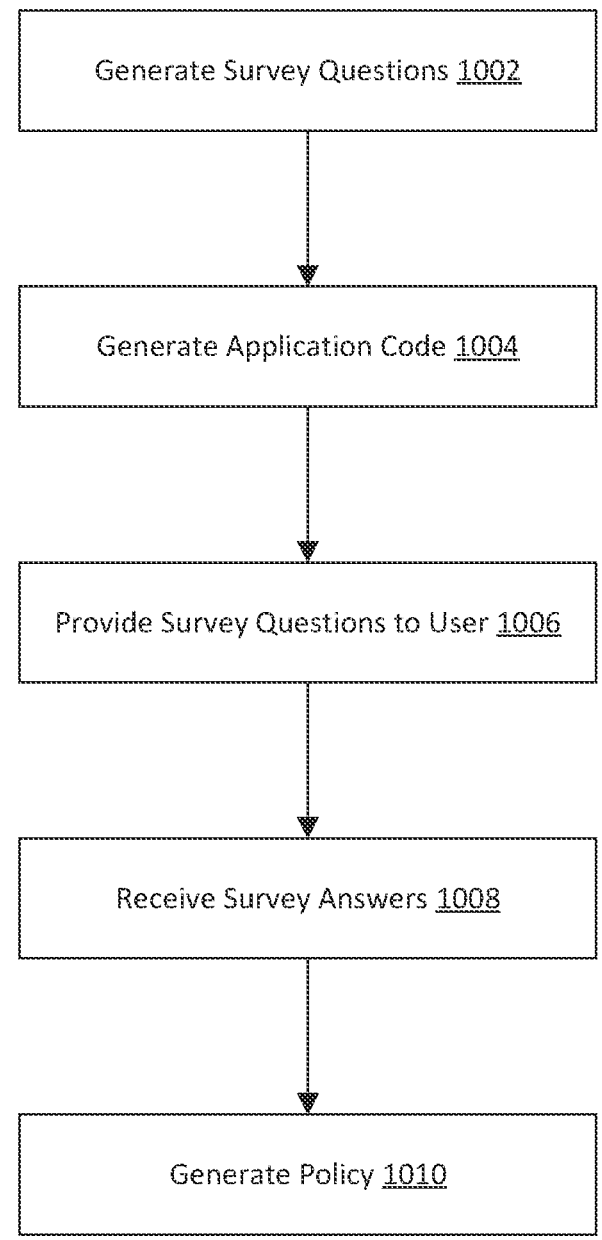
FIG. 10 is a flowchart of an example method for generating a policy.

FIG. 10 is a flowchart of an example method 1000 that may be used to generate a policy, such as an AI use policy, a policy related to intellectual property protection, a finance policy, a business policy, or another policy or strategy. In some embodiments, the policy generator 111 may perform aspects of the method 1000. As described above, the policy generator 111 may include a natural language processing tool that generates text in response to user prompts.

In the example shown, the policy generator 111 may generate survey questions (step 1002). In some embodiments, an administrator or engineer of the policy generator 111 may input a prompt into the natural language processing tool. In response, the natural language processing tool may output a plurality of questions according to the prompt. In some embodiments, the survey questions may be the same as, or overlap with, the survey questions generated by the brand protection tool as part of performing the step 204 of the method 200. As an example prompt, the administrator may input the following: "Create a list of prompts with a variety of single select and multi-select answer multiple choice answers to ask companies that would like to formulate an AI policy." As an example response, the natural language processing tool may output the following:

1) What is the primary objective of your AI policy? a. Increase operational efficiency b. Improve customer experience c. Support decision-making d. Drive innovation and research
2) Which AI ethical principles are most important for your company? (Select all that apply) a. Transparency b. Fairness c. Privacy and security d. Accountability e. Sustainability
3) Which industries does your AI policy primarily apply to? a. Healthcare b. Finance c. Retail d. Manufacturing e. Transportation f. Others (please specify)
4) What types of AI technologies does your company use or plan to use? (Select all that apply) a. Machine learning b. Natural language processing c. Computer vision d. Robotics e. Recommender systems f. Others (please specify)
5) How does your company ensure that AI systems are developed responsibly? a. Internal AI ethics guidelines b. Third-party audits c. Collaboration with external stakeholders d. Compliance with industry standards and regulations e. Others (please specify)
6) What measures are in place to prevent AI bias and discrimination? (Select all that apply) a. Diverse training data b. Regular algorithm audits c. Bias mitigation techniques d. Stakeholder involvement e. Employee training on AI ethics
7) How does your company ensure data privacy and security in AI systems? a. Compliance with data protection regulations b. Anonymization of sensitive data c. Secure data storage and transfer protocols d. Regular security audits e. Others (please specify)
8) How does your company address potential job displacement due to AI adoption? a. Retraining and upskilling programs b. Job transition support c. Collaboration with educational institutions d. Focus on AI applications that complement human tasks e. Others (please specify)

9) What methods does your company use to ensure AI explainability and interpretability? (Select all that apply) a. Adoption of explainable AI models b. Documentation of AI decision-making processes c. Communication of AI system outputs to users d. Employee training on AI systems e. Others (please specify)

10) How does your company plan to monitor and assess the impact of AI on society? a. Regular impact assessments b. Collaboration with external organizations c. Public disclosure of AI impact metrics d. Participation in industry and regulatory discussions e. Others (please specify)

In some examples, however, the natural language processing tool may output a different set of questions, or the administrator may input a different query. Furthermore, in some embodiments, the prompt and questions may relate to a domain other than using AI, such as IP protection or business.

In the example shown, the policy generator 111 may generate application code (step 1004). For example, the policy generator 111 may generate code for a website. In some embodiments, the policy generator 111 may generate code that defines an API that may be exposed by the brand protection tool 102 or the policy generator 111. In some embodiments, to generate the website code, an administrator may input another prompt into the natural language processing tool. As an example, the administrator may input the following prompt into the natural language processing tool: "Using the prompts that were generated, create the code for a website page where a person is presented each question, may answer the question using the single or multiple response options, and then click a generate button at the end of the website to generate an AI policy based on the responses input by the user." In response, the natural language processing tool may output code for a website. In some embodiments, the code output by the natural language processing tool may be integrated with an existing software program or website. In some embodiments, once the code is output by the natural language processing tool, an administrator may alter at least some of the code so that it may be run on a platform or in an environment that may be accessed by a user to generate a policy. In some embodiments, the code may include a call to an API exposed by the natural language processing tool to generate a policy based at least in part on answers to the generated survey questions or to other survey questions.

In the example shown, the policy generator 111 may provide the survey questions to a user (step 1006). For example, the user may access (e.g., via a web browser or mobile application) a website or application associated with the policy generator 111. The website or application may be based, at least in part, on the code generated by the natural language processing tool. In examples, the website or application may, pursuant to the code generated by the natural language processing tool, present the survey questions to the user. In examples, the user may provide answers to the survey questions.

In the example shown, the policy generator 111 may receive answers to the survey questions (step 1008). For example, the website or application may be configured to receive input from the user. In some embodiments, the code generated by the natural language processing tool may include one or more functions for reading and formatting user responses to the survey questions. In some examples, the policy generator 111 may generate a follow-up survey with more detailed questions based on the responses to the first survey. This iterative process may occur multiple times before a policy is generated (step 1010).

In the example shown, the policy generator 111 may generate a policy (step 1010). In some embodiments, to generate the policy, another prompt may be input into the natural language processing tool. In some embodiments, the prompt may be based at least in part on the survey questions and the responses to the survey questions. In some embodiments, the website or application may automatically generate the prompt pursuant to the code generated by the natural language processing tool at the step 1004. In response to receiving the prompt to generate a policy, the natural language processing tool may output a policy (e.g., the policy may be output to the user, to an administrator of the policy generator 111, or to another system or entity). As may be appreciated, the policy output by the natural language processing tool may depend on both the survey questions and user responses to survey questions. For example, in the context of generating an AI use policy, if a user indicates that an organization uses AI for many tasks, then the use policy generated for that user may be different than a use policy for a user that indicates that an organization seldomly uses AI or only certain people use AI.

Referring to FIGS. 1-10 generally, aspects of the present disclosure have advantageous technical features. For example, aspects of the present disclosure can provide a fast and accurate diagnosis of a client's intellectual property protection status. Furthermore, aspects of the present disclosure can leverage professional expertise to efficiently provide users with recommendations and analysis regarding the user's intellectual property. Furthermore, aspects of the present disclosure integrate various tools into an easy-to-use and easy-to access tool, the tool including an analytics engine, a survey manager, a report generator, and a visualization generation. Furthermore, aspects of the present disclosure result in in a user-friendly experience, both when inputting data and receiving a report. Furthermore, aspects of the present disclosure include interactive user interface components (e.g., an interactive visualization). Furthermore, aspects of the present disclosure may implement machine learning models for both analyzing an entity's intellectual property protection status and for generating a report for the entity. As will be apparent these are only some of the advantages provided by aspects of the present disclosure.

Referring to the Appendix generally, a plurality of questions are disclosed. One or more of the questions disclosed in the Appendix can be used, for example, to generate one or more surveys or a part of one or more surveys.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:
generating, using a machine learning model, application code for a web application, wherein the application code defines an application programming interface (API) for communicating with a remote user computing device, and wherein the application code defines an automated iterative process comprising (i) generating, using the machine learning model, a survey; (ii) providing the survey to the remote user computing device via the API; (iii) receiving, via the API, a response to the survey from the remote user computing device; (iv) updating, using the machine learning model, the survey based on the response; and (v) repeating steps (ii)-(iv);
in response to executing the application code:
providing, via the API, the survey to the remote user computing device; and
receiving, via the API, a user input from the remote user computing device, the user input comprising a plurality of responses to a plurality of questions of the survey;
calculating, based on the user input, a plurality of metrics, the plurality of metrics including a risk score and a plurality of protection scores;
determining, using the risk score and the plurality of protection scores, a net protection score;
automatically generating a protection report, the protection report comprising the net protection score and a visualization, wherein the visualization comprises a plurality of displayed protection regions, and wherein the visualization comprises a link in a displayed protection region of the plurality of displayed protection regions;
displaying the protection report via a user interface;
automatically calling, using the link, a program corresponding to the displayed protection region, wherein calling the program causes the user interface to display a popup window displaying data from the program;
wherein each displayed protection region of the plurality of displayed protection regions corresponds with a protection score of the plurality of protection scores;
wherein the visualization comprises a risk display, the risk display overlapping with at least some displayed protection regions of the plurality of displayed protection regions; and
wherein determining, using the risk score and the plurality of protection scores, the net protection score comprises determining a difference between a surface area associated with the plurality of protection scores displayed by the visualization and a surface area associated with the risk score displayed by the visualization.

2. The method of claim 1,
wherein the surface area associated with the plurality of protection scores corresponds with a surface area of a quadrilateral displayed by the visualization, and each protection score of the plurality of protection scores is represented by a distance from an origin to a vertex of the quadrilateral;
wherein the surface area associated with the risk score corresponds with a surface area of a circle displayed by the visualization.

3. The method of claim 2, wherein the visualization displays, in response to a user selection of the visualization via the user interface, data related to one or more of a selected protection score of the plurality of protection scores or the risk score.

4. The method of claim 1,
wherein the protection report further comprises a hypothetical scenario dynamically generated in response to a change to one or more responses of the plurality of responses input; and
wherein the hypothetical scenario includes a likelihood and a result.

5. The method of claim 1,
wherein the method further comprises generating a recommendation based at least in part on the risk score; and
wherein the protection report further comprises the recommendation.

6. The method of claim 1,
wherein the protection report includes a plurality of sections, the plurality of sections including an analysis section, a hypothetical section, and a recommendation section;
wherein the analysis section includes the visualization.

7. The method of claim 1,
wherein automatically generating the protection report is performed by automatically generating the protection report using a first machine learning model; and
wherein calculating, based on the user input, the plurality of metrics related to protection is performed by using a second machine learning model.

8. The method of claim 1, wherein calculating, based on the user input, the plurality of metrics related to protection comprises applying a value to each of the plurality of questions of the survey and determining a cross-question impact of two or more questions of the plurality of questions of the survey.

9. The method of claim 1,
wherein the plurality of questions of the survey include a set of binary questions and a set of multiple choice questions; and
wherein at least some questions of the plurality of questions relate to an industry, a market, or a form of intellectual property protection.

10. A system for assessing risk, the system comprising:
a user interface; and
a protection tool communicatively coupled to the user interface;
wherein the protection tool includes a processor and a memory, the memory capable of storing instructions that, when executed by the processor, cause the protection tool to:
generating, using a machine learning model, application code, wherein the application code defines an application programming interface (API) for communicating with a remote user computing device, and wherein the application code defines an automated iterative process comprising (i) generating, using the machine learning model, a survey; (ii) providing the survey to the remote user computing device via the API; (iii) receiving, via the API, a response to the survey from the remote user computing device; (iv) updating, using the machine learning model, the survey based on the response; and (v) repeating steps (ii)-(iv);
in response to executing the application code:
provide, via the user interface, a survey to the remote user computing device;
receive a user input via the user interface, the user input comprising a plurality of responses to a plurality of questions of the survey;
calculate, based on the user input, a plurality of metrics, the plurality of metrics including a risk score and a plurality of protection scores;
determine, using the risk score and the plurality of protection scores, a net protection score;
automatically generate a protection report, the protection report comprising the net protection score and a visualization; and
display the protection report via the user interface;
wherein the visualization comprises a plurality of displayed protection regions;
wherein each displayed protection region of the plurality of displayed protection regions corresponds with a protection score of the plurality of protection scores; and
wherein the visualization comprises a risk display, the risk display overlapping with at least some displayed protection regions of the plurality of displayed protection regions.

11. The system of claim 10, wherein the plurality of protection scores includes an enforcement score, a strategic coordination score, an intellectual property score, and a policies score.

12. The system of claim 10,
further comprising an intellectual property data source;
wherein the instructions, when executed by the processor, further cause the protection tool to receive intellectual property data from the intellectual property data source; and
wherein calculating the plurality of metrics related to protection is based at least in part on the intellectual property data.

13. The system of claim 10,
further comprising a management system; and
wherein the instructions, when executed by the processor, further cause the protection tool to provide each of the risk score, the plurality of protection scores, and the protection report to the management system.

14. The system of claim 10,
wherein the plurality of displayed protection regions form a quadrilateral displayed by the visualization;
wherein the risk display is a displayed shape; and
wherein the visualization displays that the displayed shape covers at least some of the quadrilateral.

15. The system of claim 10, wherein the protection report further includes risk assessment text generated by the machine learning model.

16. The system of claim 10, wherein the instructions, when executed by the processor, further cause the protection tool to alter the visualization in response to receiving an updated user input via the user interface.

17. The system of claim 10, wherein the instructions, when executed by the processor, further cause the protection tool to:
determine that the risk score is greater than at least one protection score of the plurality of protection scores;
in response to determining that the risk score is greater than the at least one protection score of the plurality of protection scores, generate a recommendation; and
embed the recommendation in the brand protection report.

18. A tool comprising a processor and a memory, the memory capable of storing instructions that, when executed by the processor, cause the tool to:
provide a survey to a user, the survey including a plurality of questions generated by a natural language processing tool in response to a first prompt;
receive a plurality of responses to the plurality of questions of the survey;
calculate, based at least in part on the plurality of responses, a plurality of metrics, the plurality of metrics including a plurality of risk scores and a plurality of protection scores;
determine, using the plurality of risk scores and the plurality of protection scores, a net protection score;
automatically generate a protection report, the protection report comprising the net protection score and a visualization, wherein the visualization comprises a plurality of displayed protection regions, and wherein the visualization comprises a link in a displayed protection region of the plurality of displayed protection regions;
display the protection report via a user interface; and
automatically call, using the link, a program corresponding to the displayed protection region, wherein calling the program causes the user interface to display a popup window displaying data from the program;
wherein each displayed protection region of the plurality of displayed protection regions corresponds with a protection score of the plurality of protection scores;
wherein the visualization comprises a risk display corresponding to the plurality of risk scores; and
wherein determining, using the plurality of risk scores and the plurality of protection scores, the net protection score comprises determining a difference between a surface area associated with the plurality of protection scores displayed by the visualization and a surface area associated with the plurality of risk scores displayed by the visualization.

19. The tool of claim 18,
wherein the tool is capable of producing a plurality of risk scores including a risk score for each of intellectual property protection, intellectual property enforcement, intellectual property policies, and intellectual property coordination; and wherein the plurality of protection scores includes a protection score for each of intellectual property protection, intellectual property enforcement, intellectual property policies, and intellectual property coordination.

* * * * *